United States Patent
Bendtsen

[11] Patent Number: 6,146,304
[45] Date of Patent: Nov. 14, 2000

[54] VEHICLE DIFFERENTIAL

[75] Inventor: Randall R. Bendtsen, Peoria, Ill.

[73] Assignee: Caterpillar Inc., Peoria, Ill.

[21] Appl. No.: 09/218,962

[22] Filed: Dec. 22, 1998

[51] Int. Cl.[7] .............................. F16H 48/08; F16H 48/22
[52] U.S. Cl. .......................................... 475/230; 475/231
[58] Field of Search .................... 475/230, 231, 475/233

[56] References Cited

U.S. PATENT DOCUMENTS

| | | | |
|---|---|---|---|
| 3,264,900 | 8/1966 | Hartupee | 475/231 |
| 3,362,258 | 1/1968 | Thornton | 475/231 |
| 3,499,348 | 3/1970 | Hartupee | 475/231 |
| 3,905,089 | 9/1975 | Osenbaugh et al. | 29/434 |
| 4,125,026 | 11/1978 | Torii et al. | 475/230 |
| 4,221,138 | 9/1980 | Stewart et al. | 475/230 X |
| 4,363,248 | 12/1982 | Brisabois . | |
| 4,467,672 | 8/1984 | Lamy . | |
| 4,543,853 | 10/1985 | von Hiddessen . | |
| 4,679,463 | 7/1987 | Ozaki et al. | 475/231 X |
| 4,722,244 | 2/1988 | Tsuchiya et al. . | |
| 4,751,853 | 6/1988 | Dissett . | |
| 4,781,079 | 11/1988 | Takahashi | 475/230 X |
| 4,787,267 | 11/1988 | Kessler et al. . | |
| 4,811,629 | 3/1989 | Monquin et al. . | |
| 4,831,890 | 5/1989 | Valentin et al. . | |
| 4,959,043 | 9/1990 | Klotz et al. | 475/230 |
| 5,098,355 | 3/1992 | Long | 475/230 X |
| 5,232,417 | 8/1993 | Amborn et al. | 475/252 |
| 5,480,360 | 1/1996 | Patzer et al. | 475/230 |
| 5,624,343 | 4/1997 | Krisher | 475/160 |
| 5,647,814 | 7/1997 | Krisher | 475/230 |
| 5,664,847 | 9/1997 | Bear et al. | 301/137 |
| 5,671,640 | 9/1997 | Valente | 74/650 |
| 5,715,733 | 2/1998 | Dissett | 74/650 |
| 5,718,653 | 2/1998 | Showalter | 475/230 |
| 5,727,430 | 3/1998 | Valente | 74/650 |
| 5,897,453 | 4/1999 | Mimura | 475/230 |

FOREIGN PATENT DOCUMENTS

| | | |
|---|---|---|
| 0802352 | 10/1997 | European Pat. Off. . |
| 936844 | 12/1955 | Germany . |
| 4036588 | 5/1992 | Germany . |
| 786593 | 11/1957 | United Kingdom . |
| 2218762 | 11/1989 | United Kingdom . |

*Primary Examiner*—Sherry Estremsky
*Attorney, Agent, or Firm*—Howard & Howard; Jeffrey L. Myers

[57] ABSTRACT

A differential apparatus for transmitting a driving force from a pinion gear supported on an input shaft to a pair of axle output shafts includes a differential case, a ring gear, and a spider gear assembly. The differential case is made from a single piece and includes a longitudinally extending central bore that defines a longitudinal axis. The differential case includes a plurality of longitudinal slots extending along an inner surface of the central bore. A ring gear is supported by the differential casing and is rotatable about the longitudinal axis by the pinion gear connected to the input shaft. The ring gear is preferably welded to the differential casing. The differential apparatus also includes a spider member that has a central body portion with a plurality of legs extending radially outwardly from the body portion. A spider gear is supported on each of the legs. The differential case can be used with either a standard differential or a limited slip differential. In the standard differential, the spider legs are received and retained within the longitudinal slots without the use of fasteners. In the limited slip differential, an actuator housing assembly includes tabs that are received in the longitudinal slots and the spider legs react against the actuator housing assembly. In both configurations, the spider gears drive side gears that are mounted to each of the axle shafts, which drive the vehicle's wheels.

31 Claims, 6 Drawing Sheets

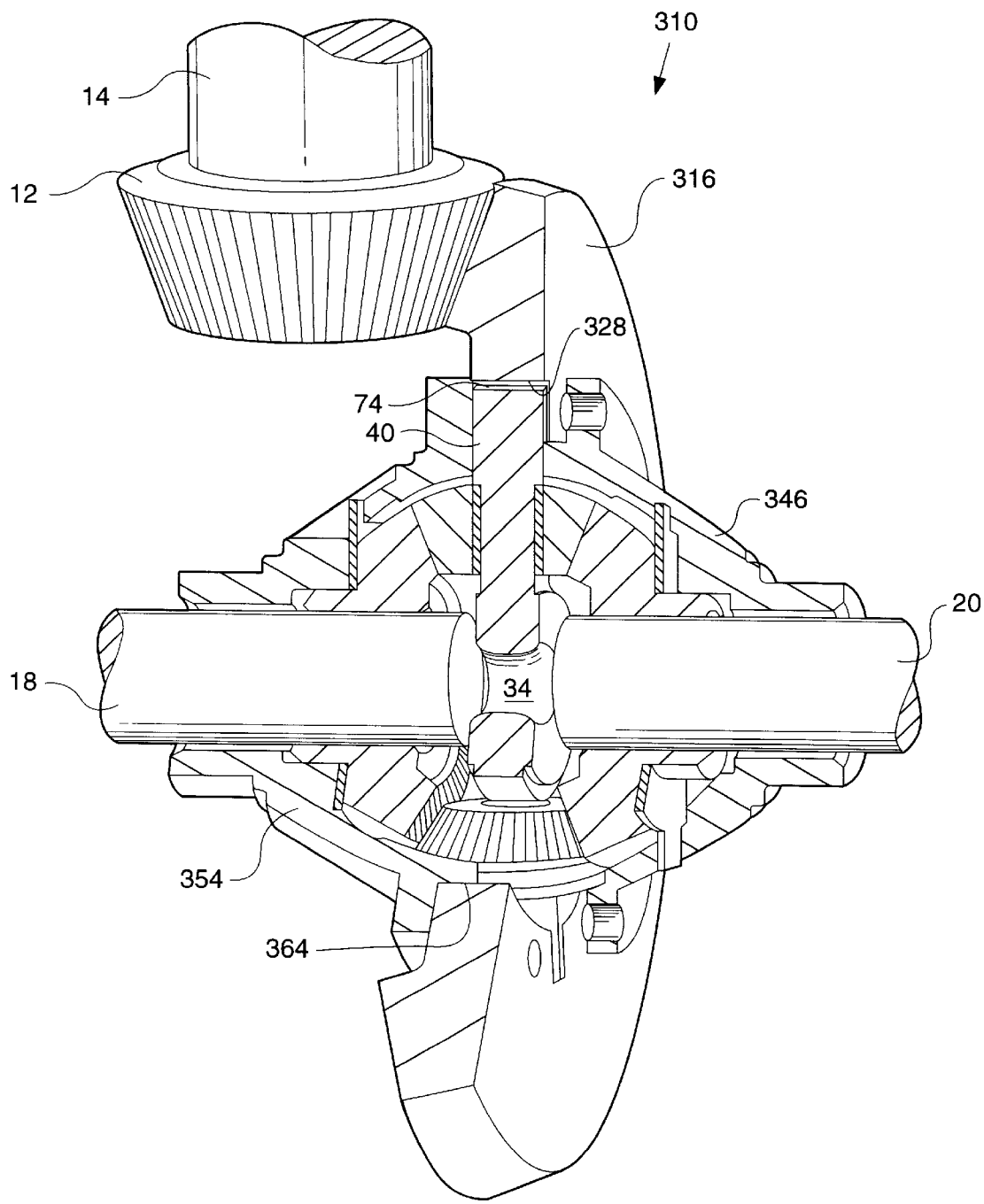
Fig_7a_

& # x20;

VEHICLE DIFFERENTIAL

TECHNICAL FIELD

The present invention relates generally to a differential assembly with a single piece differential casing that can accommodate a standard or limited slip configuration and which eliminates the use of fasteners for mounting the ring gear to the differential casing.

BACKGROUND ART

Vehicle differential assemblies are used to transmit driving torque from a vehicle engine to the wheels. A pinion gear is mounted to a vehicle driveshaft which is driven by the vehicle engine. The pinion gear is used to drive a ring gear in the differential assembly. Torque is transmitted from the ring and pinion, through the differential assembly, to a pair of transversely extending axles shafts. The torque supplied to the axles shafts is used to drive the vehicle wheels.

Traditionally, vehicle differential assemblies have been designed with a bolted joint configuration. The ring gear has a central bore that is located on the differential case by a pilot or press fit. The ring gear is attached to the differential case by a number of bolts or other fasteners. Additionally, dowels can be inserted through the ring gear and pressed into holes in the differential case to strengthen the bolted joint. It is difficult to accurately locate the holes for the fasteners and/or dowels such that the holes in the ring gear are aligned with the holes in the differential case.

Another difficulty with such a configuration is the strength and reliability of the bolted joint. During vehicle operation, vibrations and shock loads can loosen or weaken a bolted joint, which can eventually lead to failure of the joint.

Some differential assemblies also have two or more spider pinion gears located within the differential to accommodate situations where the axle shafts are turning at different speeds or in different directions. The spider pinion gears are supported on a single piece spider shaft having legs that correspond in number to the number of spider pinion gears. In other words, the spider shaft has a spider pinion gear supported on each of its legs.

Assembling a spider shaft that has more than two legs into the differential case requires the case to be made in two halves with a split along the centerline of the spider legs. Typically, these two halves are joined together by a number of bolts or other fasteners. In most instances, this is done using the same bolts that attach the ring gear to the differential case. This increases the difficulty in accurately locating the holes for the fasteners such that the holes in the ring gear are aligned with the holes in both halves of the differential case. Also, long bolts are required, which increases the cost for the differential assembly.

There are also various types of differential assemblies. There are standard differential assemblies and limited slip differential assemblies. A limited slip differential includes components for developing more traction at a wheel opposite from the wheel experiencing slip conditions. Different differential cases are required to accommodate the different components for the standard versus limited slip configurations. This proliferates the number of parts required for the differential assemblies.

Thus, it is desirable to have a differential assembly that can be used with either a standard or limited slip configuration and which does not require a bolted joint configuration so that the use of fasteners and dowels to mount the ring gear to the differential case can be eliminated. Also, it would be desirable to have a single piece differential case such that the fasteners used to connect the case halves could be eliminated. This would improve overall strength and reliability of the differential due to the elimination of the bolted joint and would also reduce cost and assembly time.

DISCLOSURE OF THE INVENTION

According to one embodiment of the present invention, a differential apparatus for transmitting a driving force from an input shaft to a pair of output shafts comprises a single piece differential casing having a central bore and defining a longitudinal axis. The differential casing includes a plurality of longitudinal slots extending along an inner surface of the central bore. The apparatus further includes a ring gear and a spider. The ring gear is supported by the differential casing and is rotatable about the longitudinal axis by a pinion gear connected to the input shaft. The spider has a central body portion with a plurality of legs extending radially outwardly therefrom. The legs are received in the longitudinal slots. A spider gear assembly has a spider gear member supported on each of the legs. The differential casing, ring gear, and spider assembly rotate together about the longitudinal axis as the driving force is transmitted from the input to the output shafts.

According to another embodiment of the invention, a differential apparatus for transmitting a driving force from an input shaft to a pair of output shafts includes a single piece differential casing having a central bore and defining a longitudinal axis. The differential casing includes a plurality of longitudinal slots extending along an inner surface of the central bore. A ring gear is supported by the differential casing and is rotated about the longitudinal axis by a pinion gear connected to the input shaft. The apparatus includes an actuator member having extensions received in the longitudinal slots. The actuator receives rotational input from the ring gear and differential housing. A spider gear assembly has a plurality of spider gear members and transmits driving input from the actuator member to the pair of output shafts. In a standard differential configuration, the actuator member is a spider having a central body portion with a plurality of legs extending radially outwardly therefrom with each of the legs supporting one of the spider gear members. The extensions are the legs which are received in the longitudinal slots. In a limited slip differential configuration, the actuator member is an actuator housing assembly having a cylindrical body with a plurality of tabs extending outwardly from and spaced circumferentially about an exterior surface. The extensions are the tabs which are received in said longitudinal slots.

In one alternate embodiment, the ring gear is integrally formed with the differential casing. In another alternate embodiment, the ring gear includes a plurality of slots for receiving the spider legs.

BEST MODE FOR CARRYING OUT THE INVENTION

Figure 1:
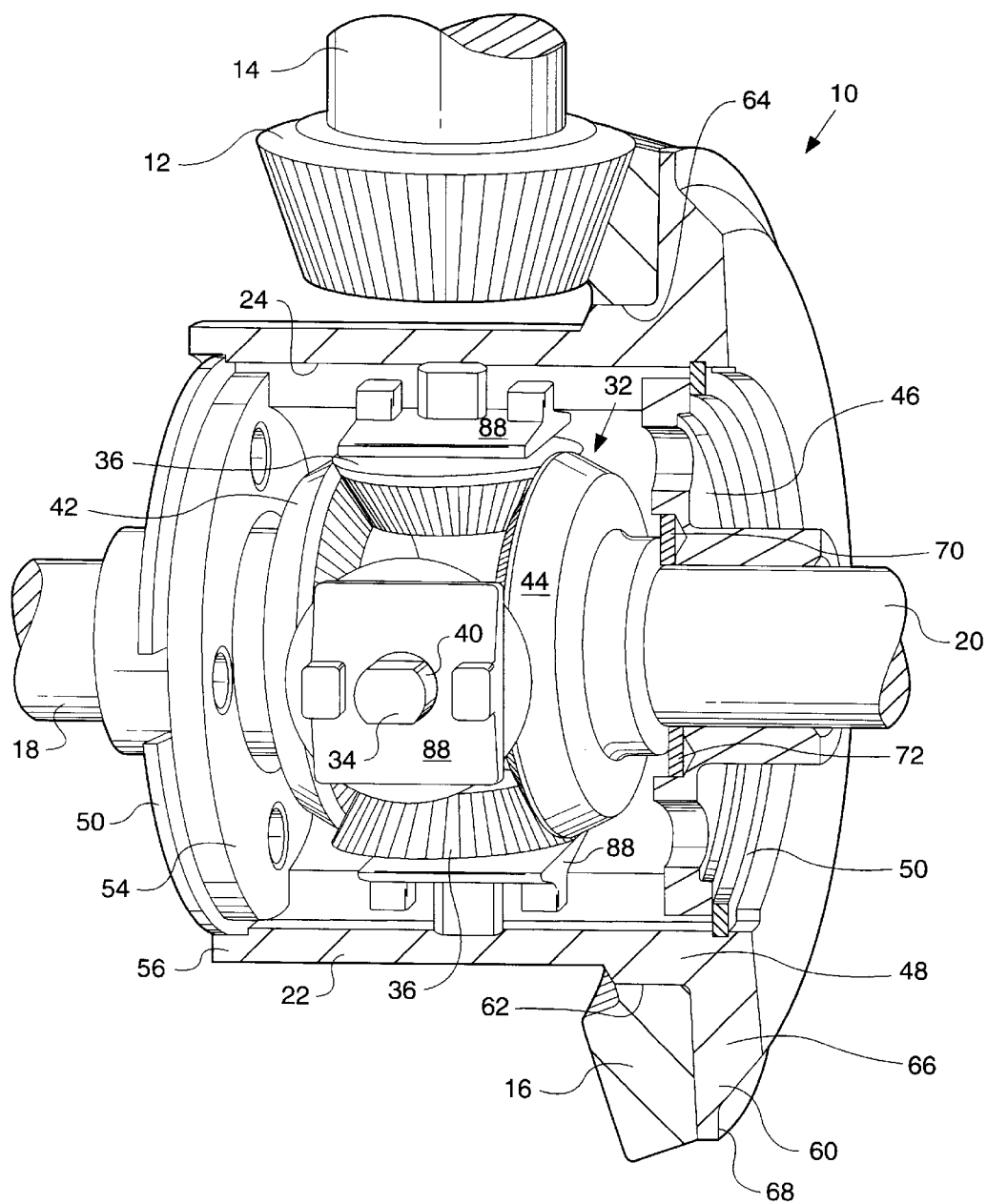
FIG. 1 is a partial cross-sectional view of a standard differential assembly incorporating the subject invention.

Referring to the Figures, wherein like numerals indicate like or corresponding parts throughout the several views, a standard differential assembly 10 is generally shown in FIG. 1. The vehicle differential assembly 10 transmits a driving force or torque from a vehicle engine to the wheels. A pinion gear 12 is mounted to a vehicle driveshaft 14 which is driven by the vehicle engine (not shown). The pinion gear 12 is used to drive a ring gear 16 in the differential assembly 10. Torque is transmitted from the ring 16 and pinion 12, through the differential assembly 10, to a pair of transversely extending axles shafts 18, 20. The first axle shaft 18 is used to drive one wheel of an axle and the second axle shaft 20 is used to drive the opposite wheel on the axle. Thus, driving torque is supplied by the engine through the driveshaft 14 to the pinion 12, the pinion 12 drives the ring gear 16 and differential assembly 10, and the differential 10 drives the axle shafts 18, 20 and ultimately the wheels.

Figure 2:
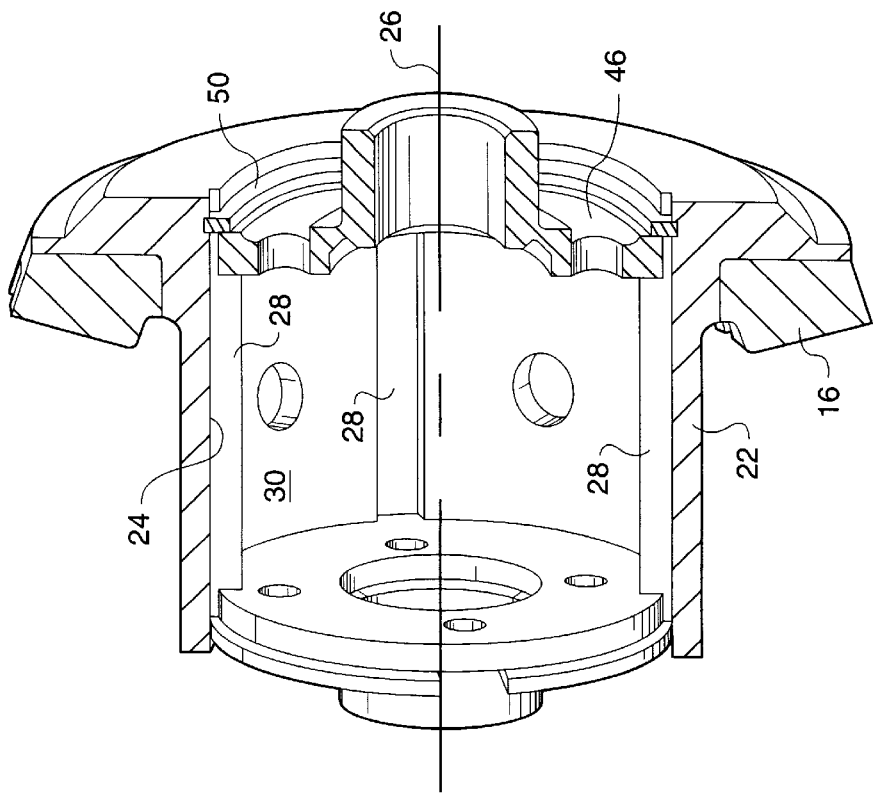
FIG. 2 is a cross-sectional view of the differential casing.

The differential apparatus 10 includes a single piece differential casing 22 made as a hollow steel casting. The differential casing 22 has a central bore 24 and which defines a longitudinal axis 26 (see FIG. 2). The differential casing 22 includes a plurality of longitudinal slots 28 extending along an inner surface 30 of the differential casing 28 which is defined by central bore 24, seen more clearly in FIG. 2.

The ring gear 16 is supported by the differential casing 22 and is rotatable about the longitudinal axis 26 by the pinion gear 12 connected to the input shaft 14.

A spider assembly, shown generally at 32, includes a spider member 34 and a plurality of spider pinion gears 36. The spider member 34 has a central body portion 38 with a plurality of legs 40 extending radially outwardly therefrom, seen more clearly in FIG. 7B. Each of the legs 40 supports one of the spider gears 36. Preferably, the longitudinal slots 28 are radially spaced about the longitudinal axis 26 at an equal distance from each other to accommodate the legs 40 of the spider member 40 which extend radially out from the center body 38 at equal distances from each other.

In the preferred embodiment, the spider member 34 has four (4) legs 40, however, other numbers of legs 40 could be used. Thus, in the preferred embodiment there are four (4) spider pinion gears 36, one supported on each of the spider legs 40. The legs 40 are received in the longitudinal slots 28 such that the differential casing 22, the ring gear 16, and the spider assembly 32 rotate about the longitudinal axis 26 as the driving force is transmitted from the input 14 to the output shafts 18, 20. The shafts 18, 20 are generally collinear and also rotate about the longitudinal axis 26. Spacers, shims, or seals 88 are mounted on each leg 40 between the casing and the spider gears 36.

When the vehicle is driving forward under normal operating conditions, the pinion 12 is driving the ring gear 16 causing the differential case 22, spider assembly 32, and axle shafts 18, 20 to rotate together. In this situation, the axle shafts will generally be turning at the same speed, and the spider gears 36 will not be individually rotating with respect to each other. However, when the axle shafts 18, 20 are under conditions where they will be turning at different speeds, such as when the vehicle is turning, the spider gears 36 in the spider assembly 32 rotate to accommodate the different rotational speeds of the axle shafts 18, 20.

The differential assembly 10 includes a first side gear 42 supported on the first axle shaft 18 for rotation therewith and a second side gear 44 supported on the second axle shaft 20 for rotation therewith such that the first 42 and second 44 side gears are rotated by the driving force received from the ring gear 16 and differential casing 22. The first 42 and second 44 side gears are preferably splined to their respective axle shafts 18, 20. As discussed above, under normal operating conditions when the vehicle is driving straight, the side gears 42, 44 are driven by the rotational supplied by the rotating ring gear 16, differential casing 22, and spider assembly 32.

Figure 4:
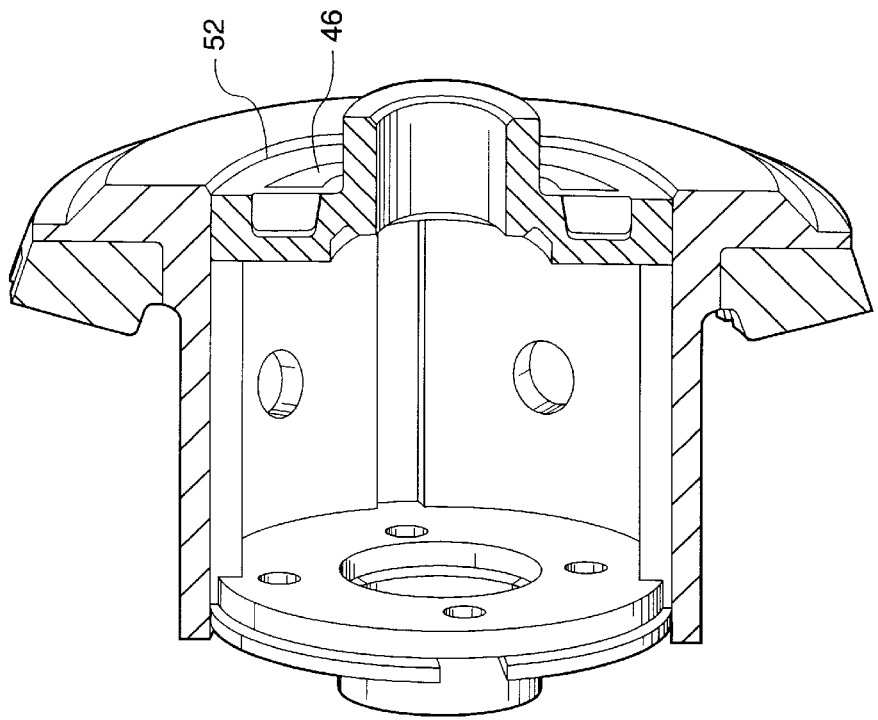
FIG. 4 is a cross-sectional view of an alternate embodiment of the subject invention.

The differential assembly 10 includes at least a first cover 46 for retaining the legs 40 in the longitudinal slots 28. The cover 46 also partially encloses one end 48 of the differential casing 22. In one embodiment, a retaining ring 50 it used to secure the first cover 46 to the differential casing 22, shown in FIG. 2. In another embodiment, shown in FIG. 4, the cover 46 is welded at 52 to the casing. The weld is preferably made by a laser, however, other welding methods known in the art, such as an electron beam weld process, could also be used. The preferred welding method is a method that produces a very concentrated weld with minimal heat input.

In the preferred embodiment, a second cover 54 is used to partially enclose an opposite end 56 of the differential casing 22. The first 46 and second 54 covers retain the spider legs 40 and spider assembly 32 within the central bore 24. Having an open bore 24 on both ends 48, 56 of the casing 22 is preferred because all four slots in the bore 24 can be broached at once before the covers 46, 54 are attached to the casing 54.

The covers 46, 54 are pressed into the bore 24 at either end and are held in place either by a retaining ring 50, welding, or other joining method. The covers 46, 54 include openings for the respective axle shaft 18, 20 to extend through. The covers 46, 54 each include a lip 70 for reacting against the respective side gear 42, 44. A seal or spacers 72 can be placed between the lip 70 and the side gears 42, 44. When the covers 46, 54 are pressed into the bore 24, the lip 70 presses against the side gears 42, 44 which press against the spider gears 36. One cover 46 applies a force in one direction and the other cover 54 applies a force in an opposing direction. The opposing forces properly locate the spider assembly 32 in the bore 24 and retain the legs 40 of the spider member 34 in their respective slots 28.

Figure 5:
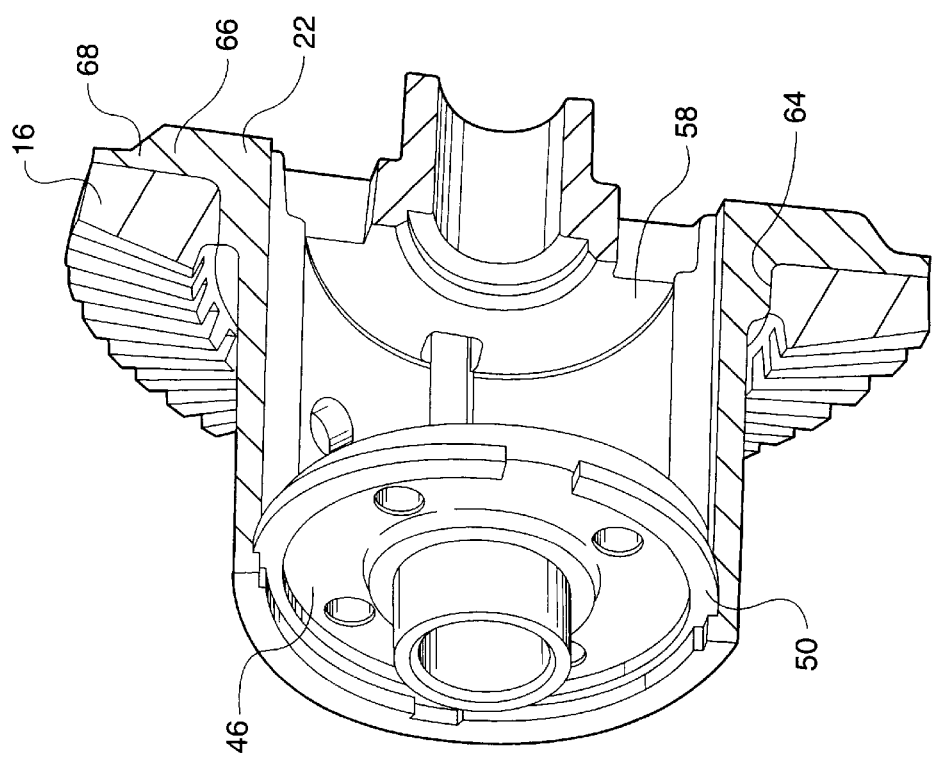
FIG. 5 is a partial cross-sectional view of an alternate embodiment using only a single cover.

In an alternate embodiment, shown in FIG. 5, the single piece differential casing 22 is substantially enclosed at one end such that it forms a cup shape 58. This configuration only requires a single cover piece 46 to retain the legs 40 within the slots 28 at an opposite end of the casing 22. Thus, this configuration eliminates the second cover 54, but requires the slots 28 to be broached individually by pulling the broach bar through cast openings in one end of the casing 22.

In either configuration, the advantage is that no fasteners are required to connect the ring gear 16 to the casing 22 and the fasteners that were required to connect two casing halves in prior art assemblies are eliminated. Thus, the differential assembly 10 of the subject invention has reduced the overall number of parts, reduced assembly time, and has simplified manufacturing of parts, from known differential assemblies.

The casing 22 preferably includes a flange 60 at one end 48 for partially supporting the ring gear 16. The casing 22 includes a support portion 62 located on an exterior surface of the casing 22 adjacent to the flange 60. The support portion 62 is preferably a turned diameter on the casing 22.

The ring gear 16 includes a center aperture 64 that is pressed on to the support portion 62. The ring gear 16 could also be attached to the casing 22 by shrinking the finish machined and heat treated gear 16 over the turned diameter on the case. The ring gear 16 is subsequently welded to the casing 22.

In the preferred embodiment, the flange 60 includes a base portion 66 extending out to a rim 68 where the rim 68 is thinner than the base portion 66. This allows the ring gear 16 to be welded to the casing 22 to a shallow depth around the perimeter of the flange 60. As discussed above, the weld is preferably made by a laser, however, other welding methods known in the art, such as an electron beam weld process, could also be used. The preferred welding method is a method that produces a very concentrated weld with minimal heat input. The outer rim 68 should be thin enough to allow that part of the casing 22 to absorb the shrinkage and distortion caused by welding, and prevent changes to the gear geometry.

Figure 3:
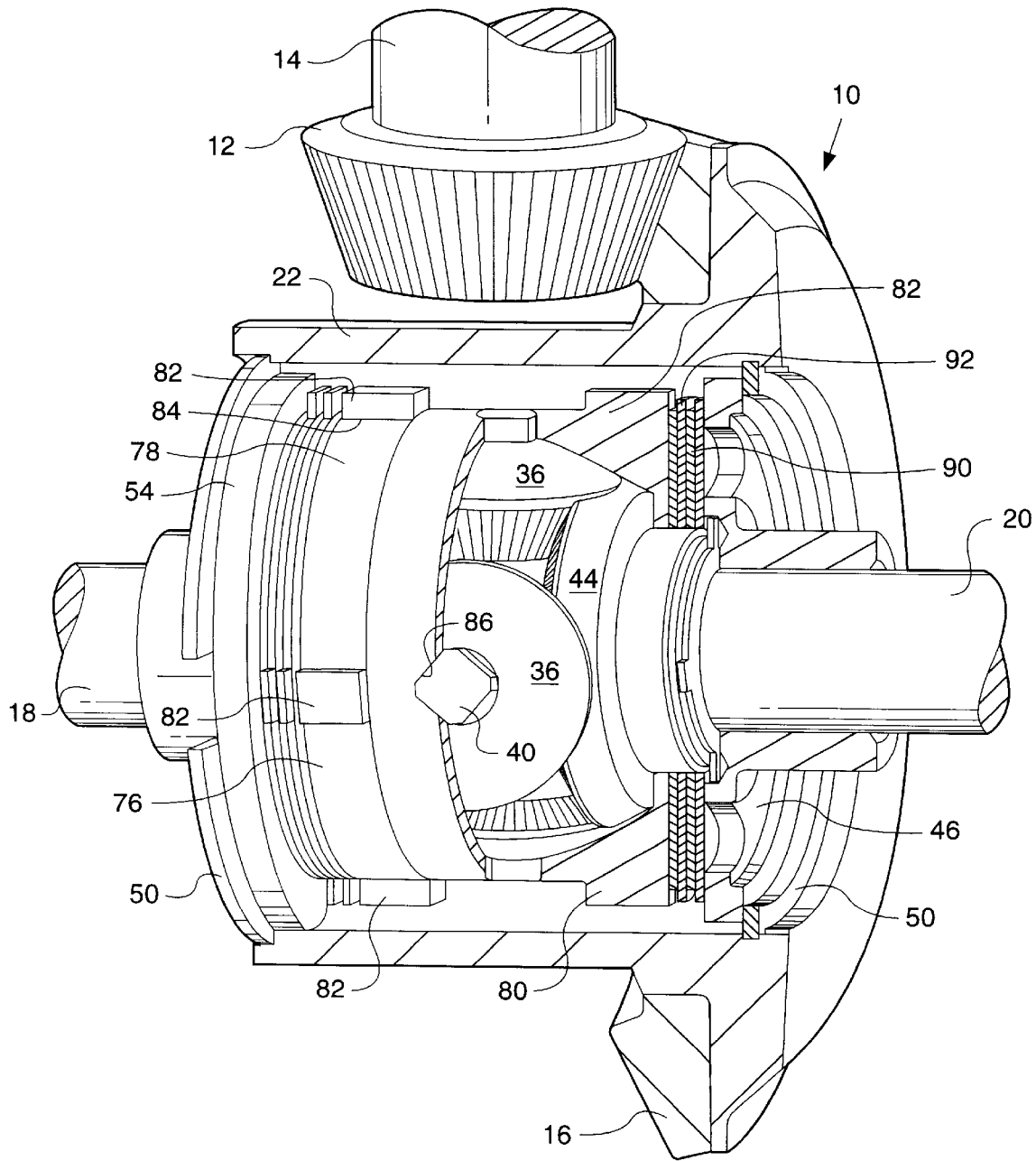
FIG. 3 is a partial cross-sectional view of a limited slip differential assembly incorporating the subject invention.

One advantage that the subject differential casing 22 offers is that it can be used with either a standard differential or a limited slip differential. In the limited slip differential configuration, shown in FIG. 3, the differential assembly 10 includes an actuator housing assembly 76. The actuator housing assembly 76 preferably includes a first housing portion 78 and a second housing portion 80. The actuator housing portions 78, 80 have a cylindrical body with a plurality of tabs 82 extending outwardly from and spaced circumferentially about an exterior surface 84. The tabs 82 are received in the longitudinal slots 28. The differential assembly 10 also includes the spider gear assembly 32, which transmits torque from the actuator housing assembly 76 to the pair of output shafts 18, 20.

The legs 40 of the spider member 40 are shorter than the legs 40 for the spider 34 used in a standard differential assembly in order to accommodate the actuator housing assembly 76. The legs 40 react against the actuator housing portions 78, 80 when the driving force is transmitted from the differential casing 22 to the spider gear assembly 32 under poor traction conditions.

The first housing portion 78 has a plurality of recesses 86 and the second housing portion 80 has a plurality of corresponding recesses 86. The recesses 86 correspond in number to the number of legs 40. The recesses 86 are preferably V-shaped notches that extend into the housing portions 78, 80. The recesses 86 of the first housing portion 78 correspond in position to the recesses 86 in the second housing portion 80 such that when the recesses 86 are aligned they form a square. Each of the legs 40 is received partly in one of the recesses 86 of the first housing portion 78 and partly in one of the recesses 86 of the second housing portion 80. The limited slip differential also includes a plurality of friction discs 90 and 92 located adjacent to one of the first 78 or second 80 housing portions. The friction disks 90 are splined to one of the side gears 44. The friction disks having a plurality of tabs 92, while not splined to one of the side gears 44, have its tabs received in the longitudinal slots 28. The covers 46, 54 hold the actuator housing assembly 76, the spider assembly 32, and the friction discs 90 and 92 in proper position within the differential casing 22.

If the limited slip differential experiences resistance to turning, such as in poor traction conditions, the housing members 78, 80 spread apart, i.e. move in opposing directions, which applies a face load to the friction discs 90 and 92. In this instance, because the friction disks 90 and side gear 44 rotate relative to the friction disks having a plurality of tabs 92 and the casing, the relative rotation between side gear 44 and the casing is limited due to increased friction between the friction disks 90 and 92. Thus, if there is poor traction at one wheel, the housing portions 78, 80 will spread apart to apply a face load to the discs 90 and 92, which causes more traction to develop at the opposite wheel.

The subject differential casing 22 offers several advantages over prior art differentials. The bolted joint is eliminated by using a single piece casing to replace the typical two-piece casing, which additionally eliminates the fasteners. The casing also can be used with either a standard or limited slip differential.

Figure 6:
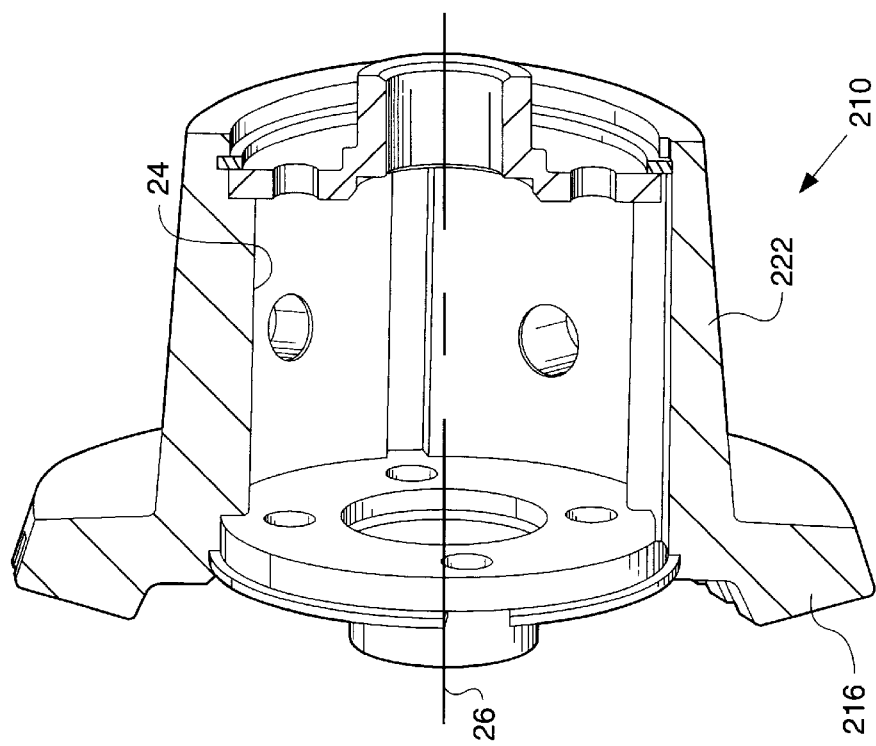
FIG. 6 is a cross-sectional view of an alternate embodiment having an integral ring gear and differential casing.

In an alternate embodiment, shown in FIG. 6, the differential assembly 210 is comprised of a single piece differential casing 222 has a central bore 24 and defines a longitudinal axis of rotation 26. The differential casing 222 has a ring gear portion 216 that is integrally formed on the exterior surface of the casing 222. The ring gear portion 216 receives input from the pinion gear 14. Thus, the pinion gear 14 rotates the differential casing 222 via the ring gear portion 216. The differential assembly 210 includes a spider assembly 32 and operates in the same manner as the differential assembly 10 discussed above.

Figure 7B:
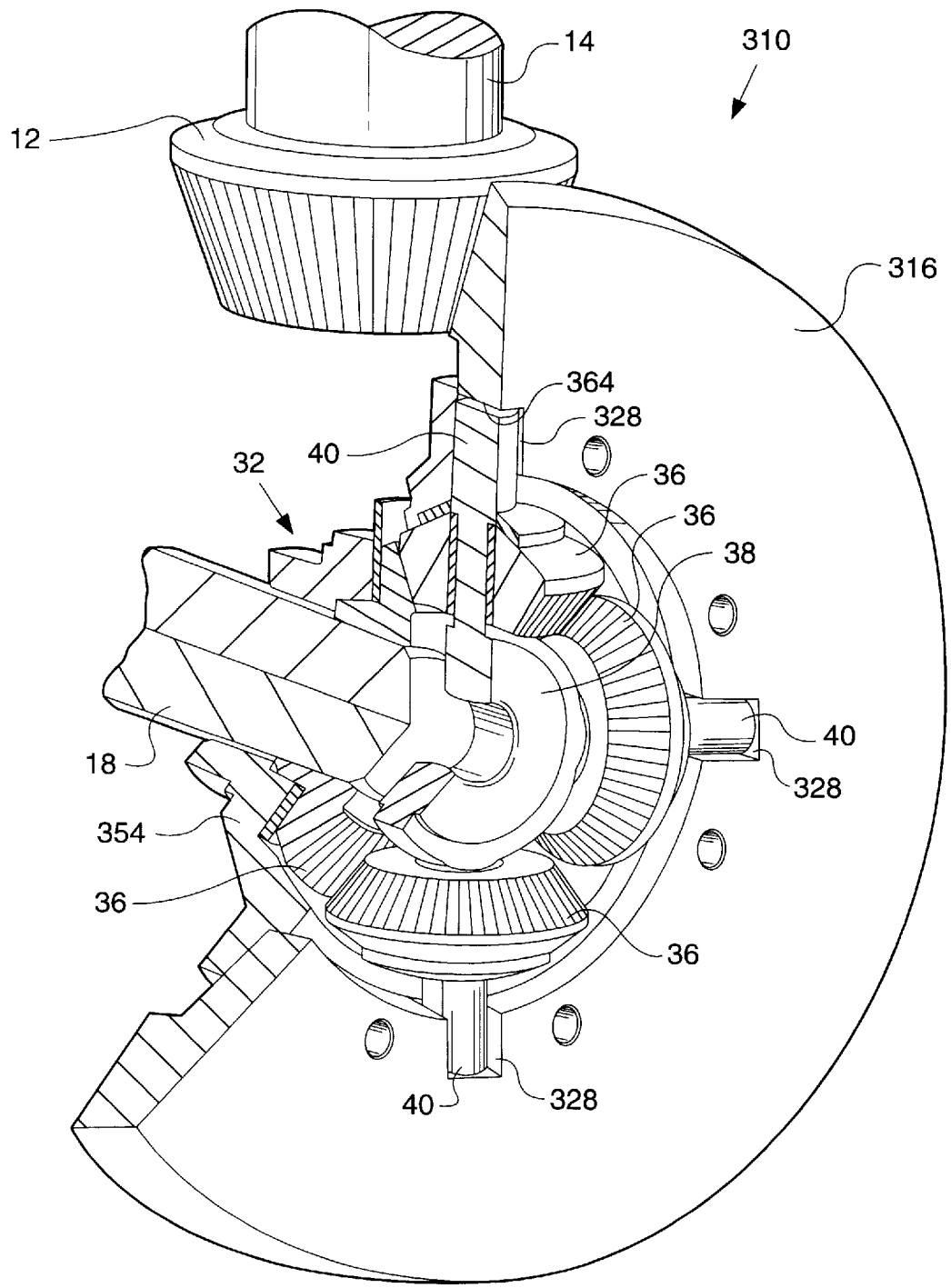
FIG. 7A is a partial cross-sectional view of an alternate embodiment of a differential assembly; and, FIG. 7B is a perspective cross-sectional view of the differential assembly shown in FIG. 7A.

In another alternate embodiment, shown in FIGS. 7A and 7B, the differential assembly 310 eliminates the differential casing 22 and instead provides longitudinal slots 328 in the ring gear 316. The ring gear 316 includes a central bore 364 from which the slots 328 extend radially outwardly therefrom. The slots 328 preferably extend along the length of the bore 364.

Each of the legs 40 of the spider member 34 have an end portion 74 that is partially received in one of the slots 328. Preferably a pair of covers 346, 354 are mounted to either side of the ring gear 316 to hold the spider 34 in place and retain the legs 40 in the slots 328. The covers 346, 354 are preferably fastened to the ring gear 316 with fasteners, however, other joining methods known in the art could also be used. In this configuration, the differential casing is eliminated and the spider 34 is assembled directly to the ring gear 316. While this configuration uses fasteners to retain the covers to the ring gear 316, the gear torque is being transmitted directly from the gear 316 into the spider 34 so that the bolted joint is no longer carrying the torque. The fasteners are only supporting the gear and can be fewer in number and smaller in diameter and length. The differential assembly 310 operates in the same manner as the differential assembly 10 discussed above.

Industrial Applicability

The present invention relates generally to a differential assembly with a single piece differential casing that can accommodate a standard or limited slip configuration and which eliminates the use of fasteners for mounting the ring gear to the differential casing.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A differential apparatus comprising:

an input shaft;

a pair of output shafts;

a single piece differential casing having a central bore and defining a longitudinal axis, said differential casing including a plurality of longitudinal slots extending along an inner surface of said differential casing;

a ring gear supported by said differential casing and rotatable about said longitudinal axis by a pinion gear connected to said input shaft;

a spider assembly including a spider member and a plurality of spider gears, said spider member having a central body portion with a plurality of legs extending radially outwardly therefrom wherein each of said legs supports one of said spider gears, said legs being received in and contacting said longitudinal slots such that said differential casing, said ring gear, and said spider assembly rotate about said longitudinal axis as the driving force is transmitted from said input shaft to said output shafts.

2. An apparatus as set forth in claim 1 wherein said pair of output shafts are comprised of a first axle shaft and a second axle shaft, said first and second axle shafts being collinear and rotatable about said longitudinal axis of rotation.

3. An apparatus as set forth in claim 2 including a first side gear supported on said first axle shaft for rotation therewith and a second side gear supported on said second axle shaft for rotation therewith such that said first and second side gears are rotated by the driving force received from said ring gear and differential casing.

4. An apparatus as set forth in claim 1 including a first cover for retaining said legs in said longitudinal slots and partially enclosing one end of said differential casing.

5. An apparatus as set forth in claim 4 including a retaining ring for securing said first cover to said differential casing.

6. An apparatus as set forth in claim 4 including a second cover for partially enclosing an opposite end of said differential casing wherein said first and second covers retain said spider and spider gear assembly within said central bore.

7. An apparatus as set forth in claim 1 wherein said single piece differential casing is substantially enclosed at one end and wherein a single cover piece is used to retain said legs within said slots at an opposite end of said casing.

8. An apparatus as set forth in claim 1 including a cover welded to one end of said differential casing for retaining said legs in said longitudinal slots.

9. An apparatus as set forth in claim 1 wherein said casing includes a flange at one end for partially supporting said ring gear.

10. An apparatus as set forth in claim 9 wherein said casing includes a support portion located on an exterior surface of said casing adjacent to said flange and wherein said ring gear includes a center aperture that is pressed on to said support portion.

11. An apparatus as set forth in claim 10 wherein said ring gear is welded to said flange.

12. An apparatus as set forth in claim 9 wherein said flange includes a base potion extending out to a rim, said rim having a smaller cross sectional area than said base portion.

13. An apparatus as set forth in claim 12 wherein said ring gear is welded to said differential casing about said rim.

14. A differential apparatus for transmitting a driving force from an input to an output without the use of fasteners comprising:
a single piece differential casing having a central bore and defining a longitudinal axis, said differential casing including a plurality of longitudinal slots extending along an inner surface of said differential casing;
a ring gear for receiving rotational input, said ring gear being fixed to said differential casing for rotation therewith about said longitudinal axis;
a spider assembly including a spider member having a plurality of legs and a spider gear supported on each of said legs, said legs being received in and contacting said slots; and
at least one cover for retaining said spider assembly within said central bore.

15. An apparatus as set forth in claim 14 including a retaining ring for securing said cover to said differential casing.

16. An apparatus as set forth in claim 15 wherein said ring gear is welded to said differential casing.

17. An apparatus as set forth in claim 14 wherein said at least one cover is comprised of a first cover partially enclosing one end of said differential casing and a second cover partially enclosing an opposite end of said differential casing, said first and second covers retaining said legs in said longitudinal slots.

18. A differential apparatus comprising:
an input shaft;
a first and second axle shafts;
a single piece differential casing having a central bore and defining a longitudinal axis of rotation, said differential casing having a ring gear portion unitarily formed on an exterior surface, said ring gear portion receiving input from a pinion gear mounted to said input shaft;
a first side gear supported on said first axle shaft for rotation therewith and a second side gear supported on said second axle shaft for rotation therewith, said first and second side gears receiving rotational input as said differential casing and said ring gear rotate about said longitudinal axis; and
a spider assembly including a spider member having a plurality of legs and a spider gear supported on each of said legs, said spider gears rotating when said first and second axle shafts rotate at different speeds.

19. An apparatus as set forth in claim 18 wherein said differential casing includes a plurality of longitudinal slots extending along an inner surface of said central bore, said legs of said spider member being received in said longitudinal slots.

20. An apparatus as set forth in claim 19 wherein said longitudinal slots are radially spaced about said longitudinal axis at an equal distance from each other.

21. An apparatus as set forth in claim 19 including at least one cover attached to one end of said differential casing for retaining said legs in said longitudinal slots.

22. A differential apparatus comprising:
an input shaft;
a first and second axle shafts;
a single piece differential casing having a central bore and defining a longitudinal axis, said differential casing including a plurality of longitudinal slots extending along an inner surface of said differential casing;
a ring gear supported by said differential casing and rotatable about said longitudinal axis by a pinion gear connected to said input shaft;
an actuator member having extensions received in said longitudinal slots, said actuator for receiving rotational input from said ring gear and differential housing; and
a spider assembly including a spider member and a plurality of spider gears, said spider member having a central body portion with a plurality of legs extending radially outwardly therefrom wherein each of said legs supports one of said spider gears, said legs being received in and contacting said longitudinal slots such that said differential casing, said ring gear, and said spider assembly rotate about said longitudinal axis as the driving force is transmitted from said input shaft to said output shafts.

23. An apparatus as set forth in claim 22 wherein said actuator member is a spider having a central body portion with a plurality of legs extending radially outwardly therefrom, each of said legs supporting one of said spider gear members, and wherein said extensions are said legs which are received in said longitudinal slots.

24. An apparatus as set forth in claim 22 wherein said actuator member is an actuator housing assembly having a cylindrical body with a plurality of tabs extending outwardly from and spaced circumferentially about an exterior surface and wherein said extensions are said tabs which are received in said longitudinal slots.

25. An apparatus as set forth in claim 24 including a spider having a central body portion with a plurality of legs extending radially outwardly therefrom, said legs reacting against said actuator housing when said driving force is transmitted from said differential casing to said spider gear assembly.

26. An apparatus as set forth in claim 25 wherein said actuator housing assembly is comprised of a first housing portion having a plurality of first recesses and a second housing portion having a plurality of second recesses, said first recesses corresponding in position to said second recesses such that each of said legs is received partly in one of said first recesses and partly in one of said second recesses.

27. An apparatus as set forth in claim 26 wherein said first and second housing portions move in opposing directions under limited slip conditions.

28. An apparatus as set forth in claim 27 including a side gear fixed for rotation with each of the output shafts, said side gears receiving input from said spider gear assembly.

29. An apparatus as set forth in claim 28 including a plurality of friction disks located adjacent to one of said first or second housing portions, a first set of friction disks being splined to one of said side gears and a second set of friction disks having a plurality of tabs received in said longitudinal slots.

30. A differential apparatus for transmitting a driving force from an input shaft to a pair of output shafts comprising:

a drive gear for receiving rotational input from said input shaft;

a driven gear defining an axis of rotation and driven by said drive gear, said driven gear having a centrally located bore with a plurality of slots radially spaced about said axis of rotation along the length of said bore;

a spider having a central body portion with a plurality of legs extending radially outwardly therefrom, said legs each having an end portion that is partially received in one of said slots; and at least one cover mounted to said driven gear for retaining said legs in said slots.

31. An apparatus as set forth in claim 30 wherein said at least one cover is a first cover mounted to one side of said driven gear and a second cover mounted to an opposite side of said driven gear, said first and second covers for retaining said legs in said slots.

* * * * *